United States Patent [19]

Huovinen

[11] Patent Number: 5,895,201
[45] Date of Patent: Apr. 20, 1999

[54] APPARATUS FOR WIND POWER

[76] Inventor: Jari Huovinen, Kilpimäen koulu as 1, 79480 Kangaslampi, Finland

[21] Appl. No.: 08/537,925
[22] PCT Filed: May 2, 1994
[86] PCT No.: PCT/FI94/00168
  § 371 Date: Jul. 8, 1996
  § 102(e) Date: Jul. 8, 1996
[87] PCT Pub. No.: WO94/25751
  PCT Pub. Date: Nov. 10, 1994

[30] Foreign Application Priority Data

May 3, 1993 [FI] Finland ................ 930259 U

[51] Int. Cl.⁶ ............................................. F03D 7/00
[52] U.S. Cl. .................... 415/2.1; 415/4.4; 415/907
[58] Field of Search ................... 415/2.1, 4.1, 4.2, 415/4.4, 905, 907

[56] References Cited

U.S. PATENT DOCUMENTS 4,154,556  5/1979  Webster .
4,421,452  12/1983  Rougemont .

FOREIGN PATENT DOCUMENTS 2 588 317  4/1987  France .
2 081 390  2/1982  United Kingdom .

*Primary Examiner*—John T. Kwon
*Attorney, Agent, or Firm*—Cushman Darby & Cushman, IP Group of Pillsbury Madison & Sutro LLP

[57] ABSTRACT

An aeroturbine is provided including a body, guide walls formed in the body for guiding the air, a rotor chamber mounted above the body, the rotor chamber housing a rotor therein, and control and gate flaps adjacent to the rotor chamber for controlling airflow. To improve airflow through the aeroturbine, an air chamber having its bottom formed by the control and gate flaps is provided below the rotor and the cover of the air chamber separating the air chamber from the rotor chamber is provided with adjustable nozzle channels.

4 Claims, 3 Drawing Sheets

APPARATUS FOR WIND POWER

This application is a U.S. National Phase of PCT/FI94/00168, filed May 2, 1994, claiming priority from Finnish Application No. U930259, filed May 3, 1993.

The present invention relates to an aeroturbine comprising a body, guide walls formed therein for guiding the wind, a rotor chamber adapted above said body, said rotor chamber housing a rotor therein, and control and gate flaps which are adapted close to said rotor chamber so as to be suited for controlling the air flow.

Aeroturbines are used to harness wind energy. Conventional aeroturbine designs are not suited for efficient utilization of light winds and winds with varying direction. A further complication often arises from the awkward control of the prior-art aeroturbines.

It is an object of the present invention to provide an aeroturbine whose rotation starts at wind speeds lower than those utilizable in the prior art and has enhanced efficiency for operation in winds with varying direction, and further offers improved controllability.

The goal of the invention is achieved by an aeroturbine construction characterized by what is stated in the appended claims.

In an aeroturbine according to the invention, below the rotor is arranged an air chamber having its bottom formed by control and gate flaps, and the cover of the air chamber separating the air chamber from the rotor chamber has adjustable nozzle channels. With the help of wind speed sensors included in the aeroturbine assembly, the gate vanes on the windward side can be controlledly opened thus permitting effective operation of the aeroturbine. The advantageous construction of the aeroturbine provides the aeroturbine with a maximum area of the air inlet which is suited for harnessing both horizontal and vertical wind streams.

In an advantageous embodiment of the invention, the exhaust chamber above the rotor forms an upward flaring conical space, the conical space houses a lens-shaped element formed by surfaces of rotation of opposed arc segments, and said space and said element of rotation of arc segments are enclosed in a cylindrical shell which is conically tapered at its upper end. The element of rotation formed by the opposed spherical surfaces, together with the cylindrical shell enclosing them, induces a swirling air flow, whose effect is to cause a negative pressure that increases the exit velocity of the air flow from the aeroturbine rotor.

In a second embodiment of the invention, the body is conically shaped and a tapering flow channel is formed by the body inner walls together with auger-curved guide walls. In a sideways wind and by virtue of the induced negative pressure, this construction achieves a minimally obstructed entry of air streams into the tapering flow channel delineated by the auger-curved guide walls of the conical body of the aeroturbine. Thus, air flow will be induced already by a light wild in the air flow channel.

The aeroturbine construction according to the invention offers a wide inlet area of air streams relative to the total area of the nozzle channels, whereby even the smallest winds can be harnessed for economically important energy production. Moreover, the control possibilities of the aeroturbine are essentially improved and the operating limitations caused by varying wind directions and weather conditions are relaxed.

The invention is next examined with reference to attached drawings, in which.

Figure 1:
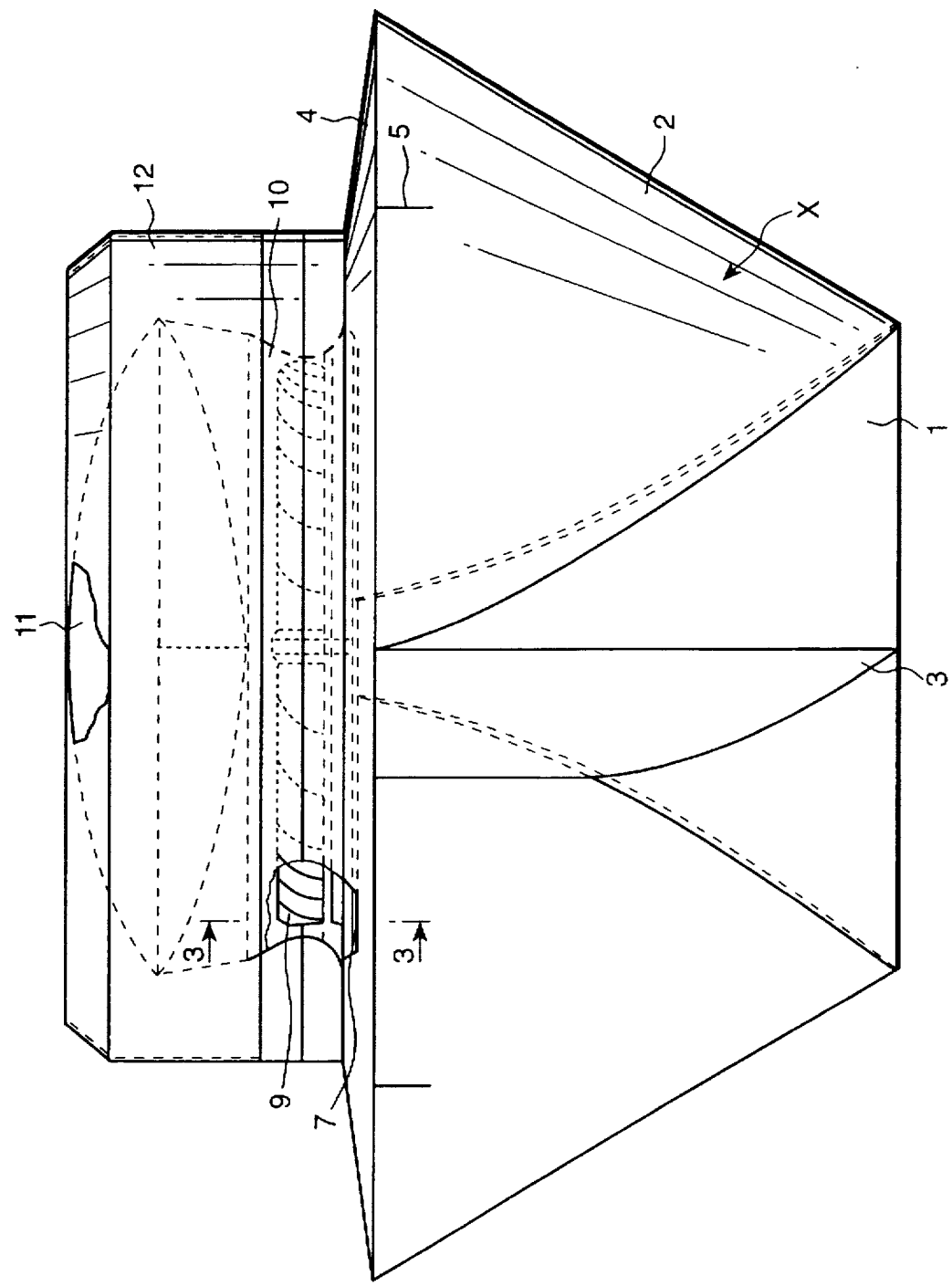
FIG. 1 is a side view of an embodiment of the aeroturbine according to the invention.
Figure 2:
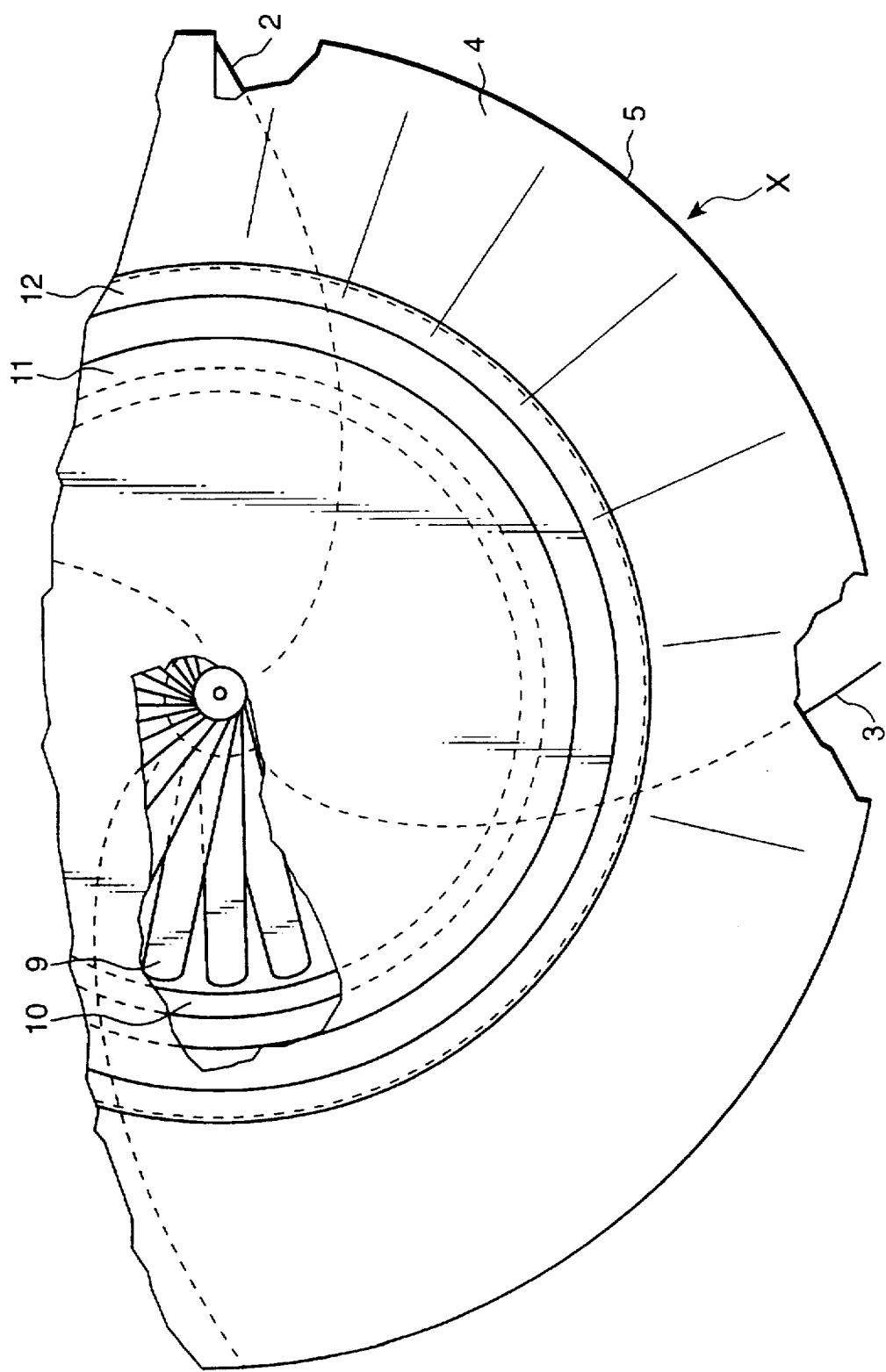
FIG. 2 is a sectional top view of the aeroturbine illustrated in FIG. 1.
Figure 3:
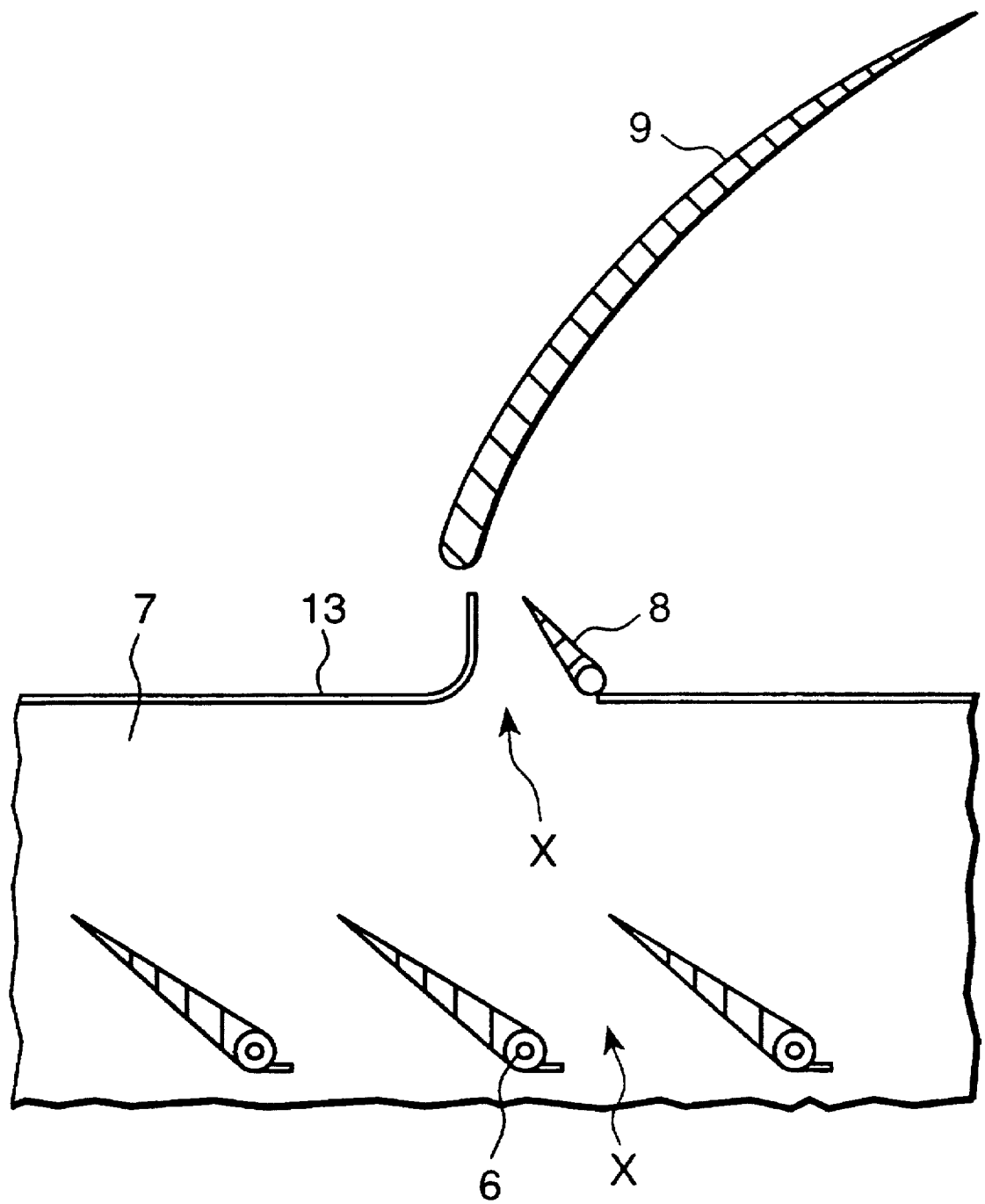
FIG. 3 is a cross-sectional view of the aeroturbine illustrated in FIG. 1 sectioned along the plane 3-3.

With reference to the embodiment shown in the drawings, the aeroturbine comprises a conical body 1 housing placed therein four guide walls 2, 3 of an auger-curved shape, an upper cone 4 attached to the conical body, wind speed sensors 5 adapted to the conical body, and control and gate flaps 6 forming the bottom of the hollow cylindrical air chamber 7, a cover 13 of the air chamber with adjustable nozzle channel 8 adapted to the cover, and a rotor 9 situated above the air chamber and placed in the lower part of the exhaust chamber formed by an upward flaring conical space 10. Above the conical space is adapted a lens-shaped element formed by the surfaces of rotation of opposed arc segments, and the conical space 10 as well as the element formed by the surfaces 11 of rotation of arc segments are enclosed in a cylindrical shell 12 which is conically tapered at its upper end.

Given a wind blowing from direction x as shown in FIG. 1, the air stream is directed to gate flaps 6 via the flow channel formed by the wall 1 of the conical body and the guide walls 2 and 3 as well as the upper cone 4. Wind speed sensors 5 placed on the outer side of the body open the windward-side gate flaps when the wind attains a predetermined minimum speed. The control and gate flaps 6 which are operated under automatic control open and guide the air flow through the flow channels in a self-sustained mode governed by the wind speed sensors.

The circular inlet of the aeroturbine is divided by guide walls 2, 3 into four equal channels. Each of these air channels is provided with an individual wind speed sensor 5 which issues open/close control command only to those control and gate flaps 6 which are located in the air channel at the specific sensor. The control and gate flaps of the other air channels remain closed if the wind stream flow rate at their dedicated sensor fails to reach the predetermined minimum value for opening the flaps. At the opening of the gate flap of an air channel, the air stream can enter a hollow cylindrical air chamber 7 located below the rotor, wherefrom the air stream is directed to the blades of the rotor 9 via automatically controlled and closable nozzle channels 8 which are directed tangentially to the rotor blades. Thus, the guided air jets impinge on the rotor blades in a manner that achieves maximum conversion of the inlet air stream kinetic energy into a torque working on the blade. The torque acting on the blades rotates the rotor, which further transmits its torque on the rotor shaft mounted on bearings, and therefrom further to the generator. The air stream leaving the blades is exhausted into the conically flaring space 10. By virtue of the negative pressure induced in said space delineated by the lens-like element 11 of spherical surfaces and the cylindrical shell 12, the air flow leaving the rotor is augmented with an increased exhaust speed.

The conical body 1 of the aeroturbine additionally houses a generator and power control/monitoring equipment, which are thus easily accessible for maintenance and operation. All such factors represent essential improvements over conventional aeroturbine embodiments.

The invention is not limited by the preferred embodiments described above, but rather, can be varied within the scope of the invention disclosed in the appended claims.

I claim:

1. An aeroturbine comprising a body, guide walls formed therein for guiding air flowing therethrough, a rotor chamber mounted to said body, said rotor chamber housing a rotor therein, and control and gate flaps for controlling air flow to said rotor chamber, characterized in that an air chamber is defined below said rotor, a bottom of said air chamber being formed by said control and gate flaps, and a cover of the air chamber separating the air chamber from the rotor chamber, said cover having adjustable nozzle channels defined therethrough.

2. An aeroturbine as defined in claim 1, characterized in that an exhaust chamber shaped into an upward flaring conical space is defined above the rotor, a lens-shaped element formed by surfaces of rotation of opposed arc segments being housed in said conical space, said conical space and said lens-shaped element being enclosed in a cylindrical shell which is conically tapered at an upper end thereof.

3. An aeroturbine as defined in claim 1 or 2, characterized in that said body is conically shaped and said guide walls are auger-curved so as to define a tapering air flow channel with said body.

4. An aeroturbine as defined in claim 1 or 2, characterized in that said nozzle channels are oriented tangentially to the blades of the rotor.

* * * * *